(12) United States Patent
Huetter

(10) Patent No.: US 6,324,550 B1
(45) Date of Patent: Nov. 27, 2001

(54) DATA OBJECT IDENTIFICATION AND REMOVAL SYSTEM

(75) Inventor: Raymond J. Huetter, New South Wales (AU)

(73) Assignee: Bullant Technology Pty Ltd (AU)

(*) Notice: Subject to any disclaimer, the term of this patent is extended or adjusted under 35 U.S.C. 154(b) by 0 days.

(21) Appl. No.: 09/474,868

(22) Filed: Dec. 29, 1999

(30) Foreign Application Priority Data

Aug. 25, 1999 (AU) .................................................. PQ 2441
Nov. 18, 1999 (AU) .................................................. PQ 4125

(51) Int. Cl.[7] ...................................................... G06F 9/00
(52) U.S. Cl. .................................. 707/206; 707/1; 707/3
(58) Field of Search ........................................... 707/1–206

(56) References Cited

U.S. PATENT DOCUMENTS

| | | | |
|---|---|---|---|
| 5,274,804 | * | 12/1993 | Jackson et al. . |
| 5,355,483 | * | 10/1994 | Serlet . |
| 5,398,334 | * | 3/1995 | Topka et al. . |
| 5,446,901 | * | 8/1995 | Owicki et al. . |
| 5,560,003 | | 9/1996 | Nilsen et al. . |
| 5,561,785 | * | 10/1996 | Blandy et al. . |
| 5,692,185 | | 11/1997 | Nilsen et al. . |

FOREIGN PATENT DOCUMENTS

| | | |
|---|---|---|
| 225755 | 6/1987 | (EP) . |
| 288146 | 10/1988 | (EP) . |
| 0 395 606 | 10/1994 | (EP) . |
| 0 881 576 A1 | 12/1998 | (EP) . |

* cited by examiner

*Primary Examiner*—Thomas Black
*Assistant Examiner*—John G. Mills
(74) *Attorney, Agent, or Firm*—Stetina Brunda Garred & Brucker

(57) ABSTRACT

A cleaner task for a computer system having a plurality of tasks for performing computing functions on objects is disclosed. References between objects form directed graphs. The cleaner task discovers all objects and starting points in the system. Each of the tasks in the system is adapted to indicate to the cleaner task the identity of any handle which has been displaced. The cleaner task defines a set of unused objects comprising initially all objects in the system. The cleaner task traverses the directed graphs commencing at the respective initial starting points of the graphs and removes from the set of unused objects the handle of each object encountered during traverse. The cleaner task then traverses all graphs for which the starting point is any handle which has been identified as displaced and, during traverse, removes the handle of each object encountered during traverse from the set of unused objects.

3 Claims, 4 Drawing Sheets

DATA OBJECT IDENTIFICATION AND REMOVAL SYSTEM

FOREIGN APPLICATION PRIORITY DATA

This application takes priority under 35 U.S.C. §119 from Australian Provisional Patent Application No. TQ4125, filed Nov. 18, 1999, and from Australian Provisional Patent Application No. PQ2441, filed Aug. 25, 1999.

The present invention relates to a data object removal system and, more particularly, to such a system particularly suited, although not exclusively, for the identification of and subsequent removal of unused or unusable data objects in a memory system of a computer system, thereby to free up system resources and, more particularly, memory resources.

BACKGROUND

All computer operating systems utilise memory systems for the storage and manipulation of data. During usage it typically occurs that portions of memory contain data which is no longer required. The system needs to be made aware that these memory portions have become available for further use. In one sense it can be said that these memory portions now contain "garbage" and there is a requirement to collect the "garbage" so as to free up the memory resources for further system-use.

In an "object oriented" form of computer system the system can be thought of as producing and using objects, the "objects" being data objects having data fields which either contain data values or pointers to objects.

FIG. 1 illustrates a generalised object oriented system 301 containing a first data object 302 and a second data object 303. The first data object 302 comprises a single data record having a number of different data fields, one of which is a pointer field 304 containing data which points to (that is, contains the memory location of) a data field 305 containing numbers in second data object 303.

In such a system memory resources can become unavailable where, for example, data objects come to point back to each other forming an island 306.

In order to get rid of this "garbage" thereby to free unused system resources most systems use some form of garbage collection.

Two commonly used current forms are "reference counting" and "mark/sweep".

Problems with current systems include inability to locate islands, a requirement that the operating system suspend processing while garbage is being collected and a general inability to consistently and comprehensively first identify and then remove unwanted or unused data objects (garbage).

It is an object of the present invention, in at least some preferred embodiments, to address or ameliorate one or more of the abovementioned problems.

BRIEF DESCRIPTION OF INVENTION

Accordingly, in accordance with one aspect one broad form of the invention there is provided a method of identification of unused data blocks in a computer system; said computer system performing computer functions by way of a plurality of tasks; each data block having a unique reference; said method comprising the steps of:

(a) designating a special purpose task as a cleaner task which identifies unused data blocks;

(b) each task adapted to indicate to the cleaner task the identity of a unique reference which it has displaced.

Preferably said cleaner task, during execution, takes into account the identity of those unique references which are indicated as having been displaced.

In accordance with a further aspect of the invention there is provided, in a computer system which includes objects with references between objects forming an at least first directed graph; said computer system performing computing functions by way of a plurality of tasks each of which operate with or on said objects and at least one of which tasks is designated as a cleaner task; the system having the property that it is possible for the cleaner task to discover all objects and all starting points; each of said tasks adapted to indicate to the cleaner task the identify of any handle which has been displaced;

a method of identification of unused ones of said objects, said method comprising the steps of, in order:

(a) initiating said cleaner task, said cleaner task defining a set of unused objects which comprises initially all objects in said system;

(b) said cleaner task traversing said directed graphs commencing at the respective initial starting points of said graphs; during traverse, removing from said set of unused objects the handle of each said object encountered during the traverse;

(c) said cleaner task traversing all graphs for which the starting point is any handle which has been identified as displaced during execution of step b; and, during traverse, removing from said set of unused objects the handle of each said object encountered during the traverse.

In accordance with a further aspect of the invention there is provided a method of removal or release of unused objects from a computer system of the type described above; said method comprising the steps of:

(a) following the above described method of identification in order to identify a set of unused objects, (b) making available to said system for re-use the memory locations occupied by said set of unused objects.

In accordance with a further aspect of the invention there is provided a data object identification system operating according to the above described method.

In accordance with a further aspect of the invention there is provided a data object identifier and removal system operating according to any one of the above described methods and wherein said cleaner task makes available to said computer system for reuse data objects which have been identified as unused data objects.

In accordance with a further aspect of the invention there is provided a computer architecture which supports a cleaner task; said architecture arranged, in an at least first mode of operation to take and store elsewhere a value immediately prior to said value being over-written.

Preferably said value which is stored elsewhere is accessible to a cleaner task.

In one preferred form the computer architecture is implemented in hardware.

In an alternative preferred form the computer architecture is implemented in software.

In yet an alternative preferred form the computer architecture is implemented in microcode.

In yet a further aspect of the invention there is provided a method of identification of unused data blocks in a computer system implemented as a cleaner task which can run concurrently with other tasks performed by the computer system; each data block having a unique reference; said method comprising the steps of:

(a) designating a special purpose task as said cleaner task which identifies unused data blocks;

(b) each task adapted to indicate to the cleaner task that it has caused a unique reference to be overwritten.

Preferably said cleaner task, during execution, takes into account the identity of those unique references which are indicated as having been displaced.

BRIEF DESCRIPTION OF DRAWINGS

Embodiments of the present invention will now be described with reference to the accompanying drawings wherein.

DETAILED DESCRIPTION OF PREFERRED EMBODIMENTS

Figure 1:
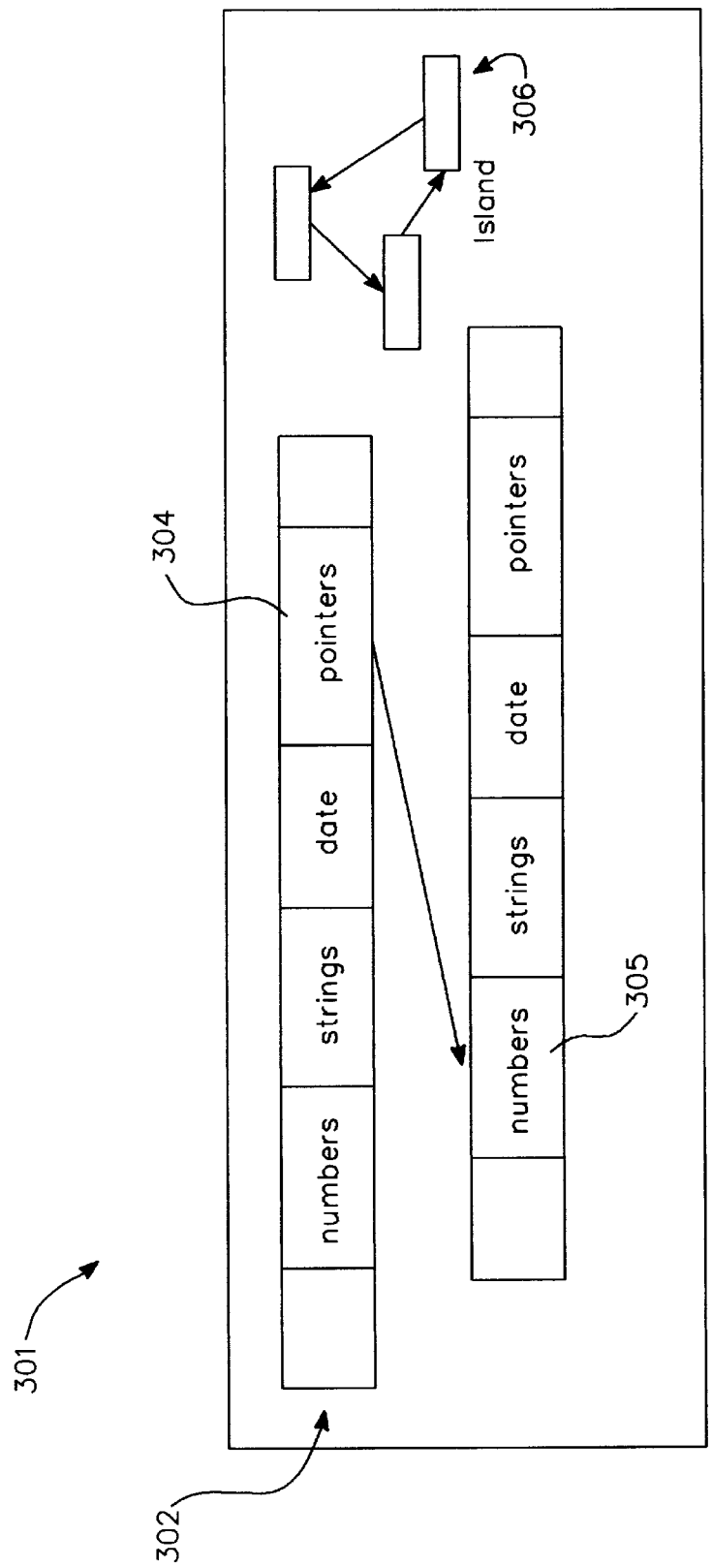
FIG. 1 illustrates a simplified prior art object oriented system.
Figure 2:
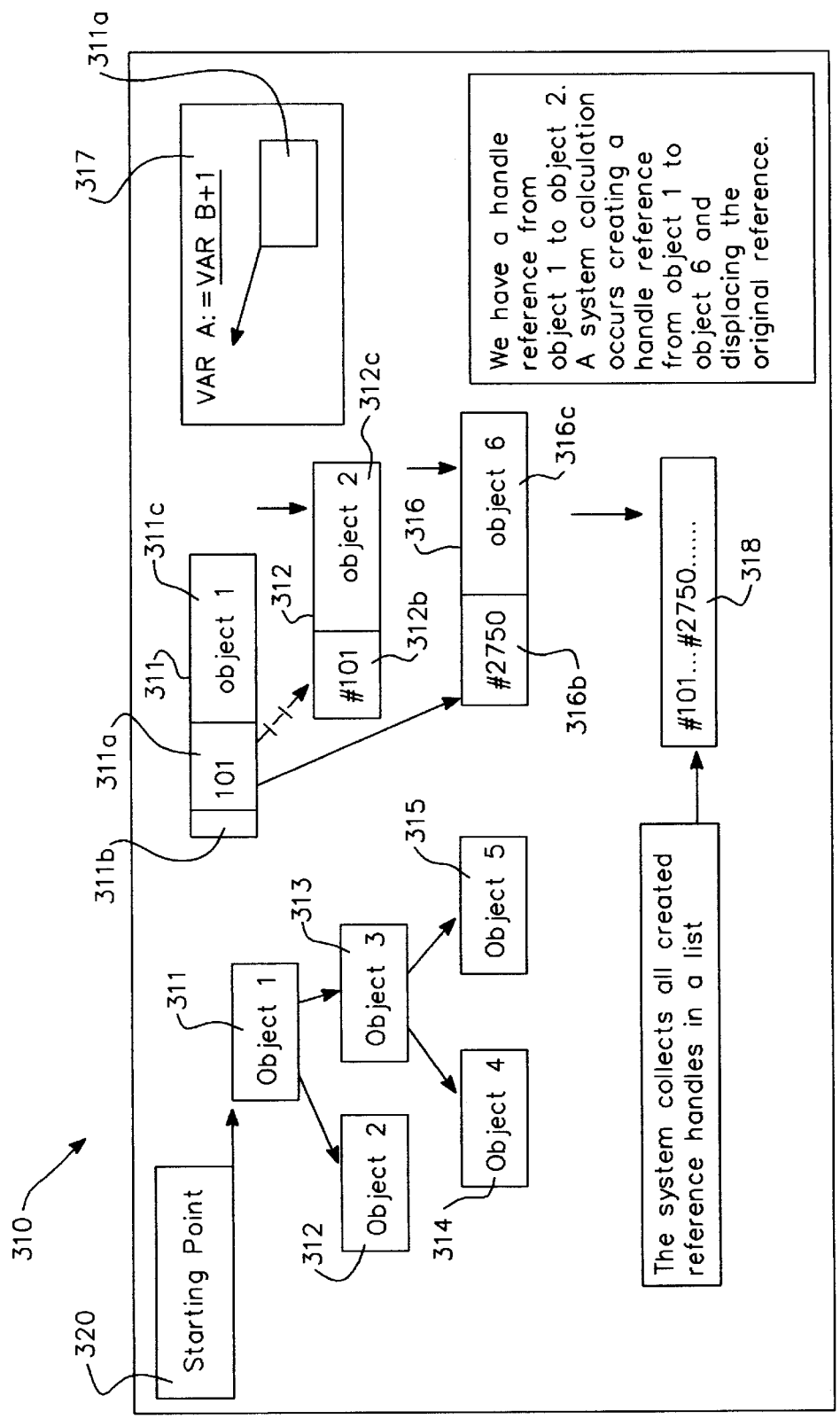
FIG. 2 is a block diagram of a system of objects suitable for application of the method of the present invention.

With reference to FIG. 2 there is illustrated a system 310 suitable to perform data processing on a computing platform (not shown).

The system 310 comprises a plurality of data objects 311, 312, 313, 314, 315. Each object comprises at least one data record having at least a pointer field 311a adapted to point to the location of another object, in this case object 312. In all instances each object has a unique reference or. "handle" 311b associated with it. (The corresponding handle of an object is identified by the suffix b so, for example, the handle of object 312 is handle 312b).

The system 310 can be described as a "directed graph" of objects 311, 312 . . . having a remembered or initial starting point 320. In this instance first object 311 is the first object of the system 310 pointed to by starting point 320.

In normal use each of the data objects will also include a plurality of data fields 311c, 312c, . . . which will contain data required by the computing operation relevant to the current computing tasks which system 310 is being asked to undertake in programmed manner.

In use the system 310 will be in a state of flux with many tasks running as a consequence of which new objects are created and pointer fields are continually being updated to point to different objects according to the demands of the computing task or tasks at hand. So, for example, a sixth object 316 can come into existence having handle 316b (numerically identified in this case as #2750) and, further, the system is updated whereby pointer field 311a of first object 311 is updated to point to handle 316b instead of handle 312b. The original handle in pointer field 311a has thus been "displaced" by another handle.

As a result of this operation second object 312 is no longer pointed to by any other object in the directed graph of system 310. Hence second data object 312 is now effectively garbage and a candidate for identification for removal.

Figure 3:
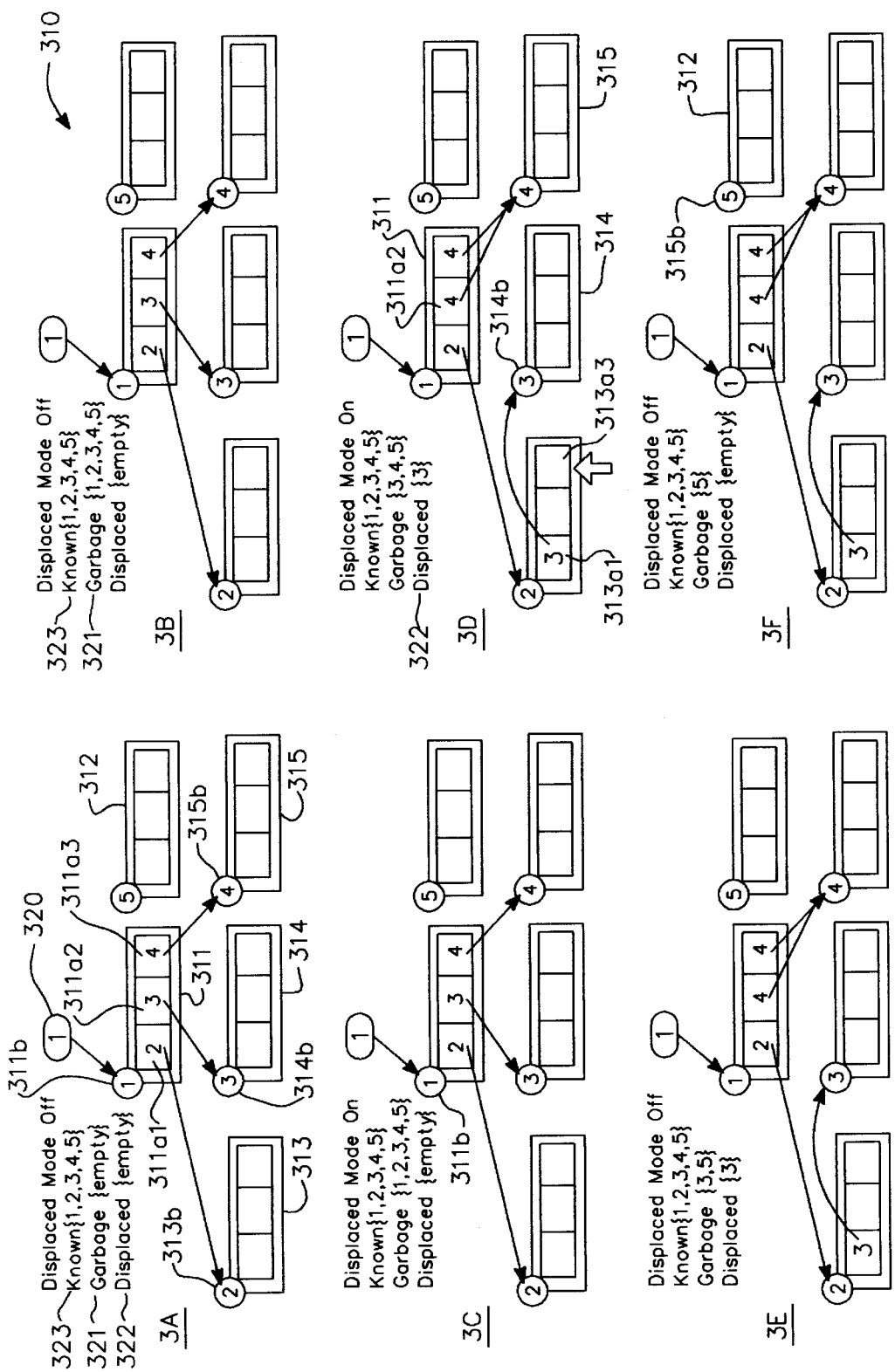
FIG. 3 is a sequential block diagram of a method of object identification for removal according to a first embodiment of the invention applied to the system of FIG. 2.

The manner of identification for removal of data object 312 from the system 310 will now be exemplified according to a first preferred embodiment of the invention with reference to FIG. 3. In this instance the method of identification for removal will be allocated to a specific task running on the system 310 and is henceforth termed a "cleaner task".

In this embodiment, in order to facilitate the data identification for removal system (cleaner task) of FIG. 3, the system 310 maintains a list 318 of all handles 311b, 312b . . . during execution. In general, the cleaner task includes an ability to discover all objects and all initial starting points. The maintenance of the list 318 is one way of ensuring this.

Initially, immediately prior to commencement of a garbage collection or data object identification for removal process being initiated the system 310 is as indicated in FIG. 3A comprising second data object 312 now isolated and with first data object 311 having three pointer fields 311a1, 311a2 and 311a3 pointing to respective handles 313b, 314b and 315b of respective third, fourth and fifth objects 313, 314, 315.

Initial starting point 320 points to handle 311b of first object 311.

Also, for the purposes of operation of the cleaner task of this embodiment, a set of unused objects 321 or "garbage set" is initialised and will initially comprise an empty list.

Also defined is a displaced set 322 which is designated to contain all handles which have been displaced during system operation, at least during a predetermined period of time or period of system operation. In this instance, initially, the displaced set 322 is empty which is to say it contains no handles (or information which would allow the location of handles) which have been displaced during operation of system 310. In this instance the condition or time when system 310 will place displaced handles into the displaced set 322 is when the system 310 is in a mode of operation termed, in this example, "displaced mode on". When system 310 is not in this mode it is said to be in the mode "displaced mode off". In this instance the system 310 will be put into displaced mode on when the cleaner task is active.

In this instance the system 310 also maintains a known set of objects 323 in the form of a list of all objects 311, 312, . . . in system 310. This arrangement is one way of ensuring that the cleaner task can discover all objects of system 310 at any given time.

The cleaner task can now proceed as follows with reference to FIGS. 3A through to 3F of FIG. 3;

EXAMPLE

Cleaner Task Operation

FIG. 3A

1. There is one known initial starting point or "root" 320 in the system 310.
2. At some point of execution there is a directed graph of five objects as shown in FIG. 3A.
3. At this point the second object 312 cannot be reached from any object within the directed graph attached to the root.
4. There is one user task in the system.
5. There is one cleaner task in the system.
6. The cleaner task is dormant, and the system is in displaced mode off.
7. The cleaner task wakes. (The cleaner task can be woken according to a time schedule eg. Every 30 seconds. In more sophisticated systems triggering may also result from other factors such as a high rate of creation of objects).

FIG. 3B

8. The cleaner task copies all references from the known set 323 into the garbage set 321.

FIG. 3C

9. The cleaner task puts the system into displaced mode on.
10. The cleaner task then proceeds to walk or traverse the directed graph of objects looking for object references (handles). The order of traversal is depth first and then, within objects, left to right. Any references that are found are removed from the garbage set 321/ The first two references that the cleaner finds are {1} and {2}. These are removed from the garbage set.

FIG. 3D

11. At some point the cleaner is walking through the fields or cells of second object 313 and is at third field or cell 313a3.
12. At this point the user task deposits a handle reference 314b to third object 314 into first field 313a1 of second object 313.
13. The user task then deposits a handle reference 315b to fourth object 315 into second field or cell 311a2 of first object 311.
14. This deposit causes the handle or reference to object #3 to be displaced.
15. This displaced handle reference {3} to third object 314 is put into the displaced set 322.
16. The cleaner task continues independently of the user task and completes its traversal, removing reference {4} from the garbage set.

FIG. 3E

17. At the end of the walk or traverse the cleaner task puts the system into displaced mode off.
18. At this point 3 and 5 are in the garbage set and 3 is in the displaced set.
19. The cleaner task removes each handle from the displaced set 322 and uses each such handle as the initial starting point or root and performs a traverse of the graph readable from each such handle. Any references that are found are removed from the garbage set 321.

FIG. 3F

20. The cleaner task removes the reference to object 3 from the garbage set 321.
21. The final garbage set 321 has the handle 315b of second, object 312 in it.
22. This object is garbage and can be deleted or re-used.

In a particular preferred form any handle which has previously been encountered during a traversal of a given directed, graph will cause the cleaner task to backtrack up that directed graph.

Summary

The system described with reference to FIG. 3 works on an underlying assumption that any data field inspected will be in a stable state with valid data in it. So, for example, there can be systems where data fields move into an indeterminate state during a number of clock cycles of the system. It is assumed that the cleaner task and any of the other tasks upon which it relies will not make use of data whilst in an indeterminate state.

It will be observed from the description with reference to FIG. 3 that an expected characteristic of operation of system 310 is that the at least one user task has the ability to recognise displaced handles and, at least while the system is in displaced mode on, to place either the displaced handles or information pertaining to the identity of the displaced handles, into the displaced set 322 or otherwise make available that information to the cleaner task in order to allow the cleaner task to conduct the (subsequent) traverses described with particular reference to FIGS. 3E and 3F and, specifically, step 19.

That is, stated in another way, the designated cleaner task expects assistance from all other tasks running on the system, at least during a predetermined period of operation which, with reference to FIG. 3, is designated "displaced ode on".

The collection of displaced handles permits the tasks to keep executing or be executed even whilst the cleaner task is in operation.

This concept of the system "remembering" displaced data in the form of displaced handles can be implemented in hardware, software, or microcode.

Described below is a particular embodiment where this characteristic is implemented directly at the hardware level.

Computer Architecture Implementation

Figure 4:
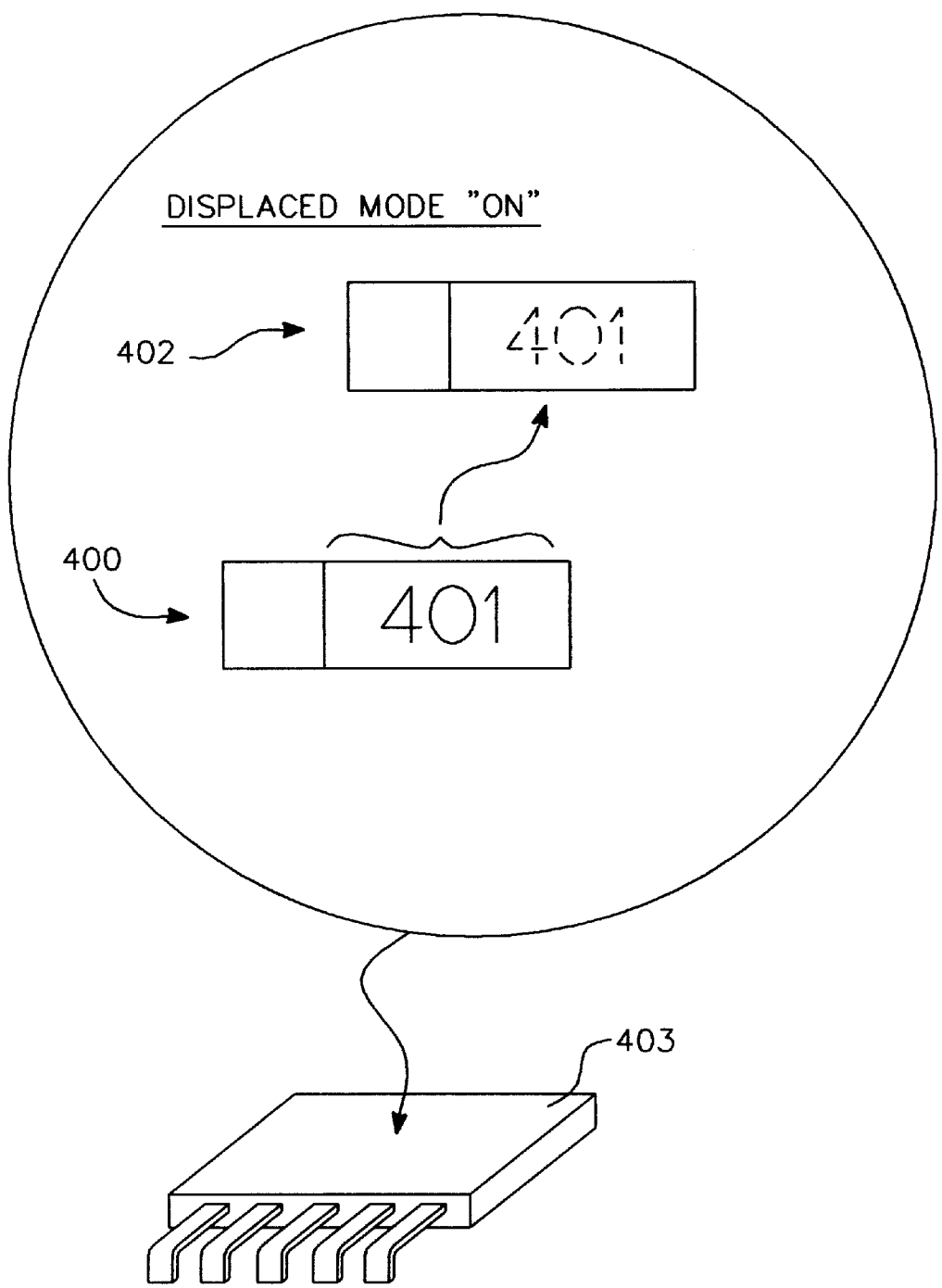
FIG. 4 is a block diagram of a computer architecture to which a further preferred embodiment of the invention has been applied.

With reference to FIG. 4 the identification methods inherent in the cleaner system previously described with reference to FIGS. 2 and 3 can be facilitated by arranging that when a first value 401 in a first register 400 is about to be overwritten the value 401 is first written to a second register 402.

This procedure can be carried out for operations or, multiple values over multiple registers during a predefined window of operation of the architecture or during a predefined mode of operation of the architecture.

The architecture can be implemented in software or in microcode or in hardware, for example as part of a microprocessor 403.

The above describes only some embodiments of the present invention and modifications, obvious to those skilled in the art can be made thereto without department from the scope and spirit of the present invention.

What is claimed is:

1. In a computer system which includes objects with references between objects forming an at least first directed graph; said computer system performing computing functions by way of a plurality of tasks each of which operate with or on said objects and at least one of which tasks is designated as a cleaner task; the system having the property that it is possible for the cleaner task to discover all objects and all starting points; each of said tasks adapted to indicate to the cleaner task the identify of any handle which has been displaced;

a method of identification of unused ones of said objects, said method comprising the steps of, in order:
(a) initiating said cleaner task, said cleaner task defining a set of unused objects which comprises initially all objects in said system;
(b) said cleaner task traversing said directed graphs commencing at the respective initial starting points of said graphs; during traverse, removing from said set of unused objects the handle of each said object encountered during the traverse;
(c) said cleaner task traversing all graphs for which the starting point is any handle which has been identified as displaced during execution of step b; and, during traverse, removing from said set of unused objects the handle of each said object encountered during the traverse.

2. A data object identification system operating according to the method of claim 1.

3. A data object identification and removal system operating according to the method of claim 1 and wherein said cleaner task makes available to said computer system for reuse data objects which have been identified as unused data objects.

* * * * *